June 7, 1932.   L. G. S. BROOKER   1,861,836
PHOTOGRAPHIC EMULSION
Filed March 19, 1930

Leslie G. S. Brooker,
Inventor.

Patented June 7, 1932

1,861,836

UNITED STATES PATENT OFFICE

LESLIE G. S. BROOKER, OF ROCHESTER, NEW YORK, ASSIGNOR TO EASTMAN KODAK COMPANY, OF ROCHESTER, NEW YORK, A CORPORATION OF NEW YORK

PHOTOGRAPHIC EMULSION

Application filed March 19, 1930. Serial No. 437,017.

This invention relates to a new composition of matter and particularly to a new class of photographic sensitizing dyes and methods for their preparation.

It is well known in the photographic art, that in order to render photographic emulsions sensitive to substantially all the visible rays of the spectrum, it is necessary to treat the emulsion, either by overcoating or by admixture with the emulsion itself, with a compound which extends the sensitivity of the emulsion beyond its natural sensitivity. An untreated emulsion will generally record only the short waves, such as the blue and violet. By the proper use of a suitable dye, this restricted sensitivity can be varied at will within certain limits; for example, the emulsion can be rendered strongly sensitive to green or blue or to any of the other visible bands of the spectrum, or it can be rendered sensitive to all the visible rays in substantially equal degrees.

The object of the present invention is to provide a light sensitive emulsion, the sensitivity of which is augmented over certain bands of the spectrum. Another object of this invention is to provide a light sensitive dye to be incorporated in or coated upon, photographic gelatino - silver - halide emulsions in order to increase their color sensitivity. A further object of this invention is to provide a method for the preparation of such dyes. Other objects will hereinafter appear.

I have found that cyanine dyes and particularly the thio-iso-cyanines and the thiopseudo-cyanines, the latter being sometimes called thio-$\psi$-cyanines, which have been prepared from mu methyl naphthothiazole, as well as the 8-methyl and naphthalene substituted thiocarbocyanines, either substituted or unsubstituted, represent classes of dyes which are excellent photo-sensitizers. These dyes, when prepared in the manner described herein, together with the substitution products of these dyes, are especially useful for addition directly to the gelatino-silver-halide emulsion, which may be coated on plates, films or other materials. Furthermore, these dyes are useful as overcoatings for photographic light sensitive surfaces, thereby increasing the light sensitivity of that surface.

In the accompanying drawing the color sensitivity of test emulsions, in which members of the class of dyes were incorporated, are shown.

Figure 1:
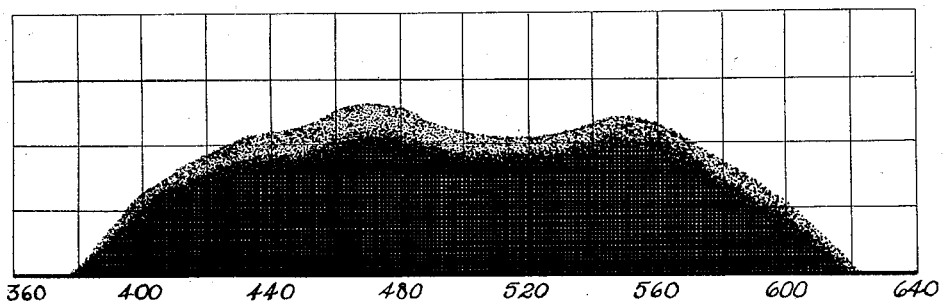

Figure 1 is a reproduction of a plate coated with an emulsion containing 1':2 diethyl-3:4-benzothio-iso-cyanine iodide which was exposed in a spectro sensitometer. The abscissae are graduated in micromillimeters ($\mu\mu$) while the ordinates are graduated in divisions denoting a decreasing intensity of the light rays as they affect the emulsion, the greatest intensity of any wave being at the base line. Below the stippled area complete maximum density is indicated with no appreciable reduced silver at the upper boundary of the stippled area. A gradual gradation in intensity extends through this area. The emulsion, of course, is fully reduced below the stippling. It will be noted from this chart that this dye renders the photographic emulsion highly sensitive at a wave length of 560 $\mu\mu$ and from there on extending well into the yellow, its sensitivity ending at little beyond 600 $\mu\mu$. It will likewise be noted that there is unusually good strength through the green.

Figure 2:
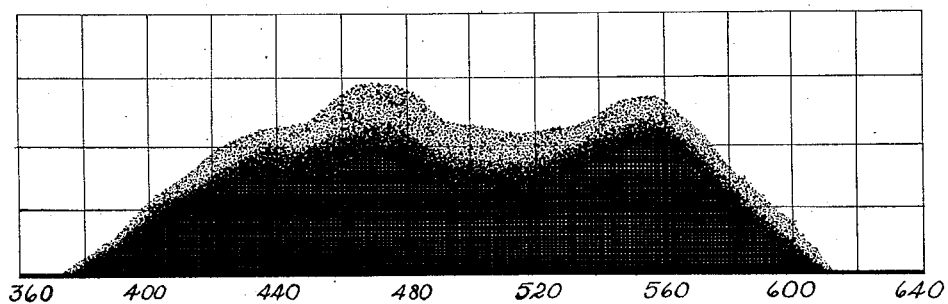

Figure 2 is a drawing of a similar chart resulting from the exposure of a plate coated with 1':2 diethyl 3:4 benzothio-pseudo-cyanine iodide. This dye gives a sharp maximum at 560 $\mu\mu$ with a fair strength in the green, the sensitivity extending to about 610 $\mu\mu$. The emulsion, as was stated above, is responsible for the greater part of the sensitivity in the blue and violet 390–500 $\mu\mu$.

I will now explain a method for the proproduction of this particular class of dyes, but it will be understood that I am not to be restricted by the definite proportions or exact ingredients therein given except as they may be so indicated by the claims appended hereto. It will likewise be understood that the chemical structural formulæ employed herein are theoretical and are given so that those skilled in the art may more readily understand the composition of these dyes. Whether or not the chemical structure given is correct will in no way limit the scope of this invention as the methods for the preparation of the dyes, together with the suggested equivalents that may be used in such preparations will enable the skilled organic chemist to prepare these dyes, whatever their theoretical structural formulæ may be.

The structural formulæ given, however, are believed to be correct according to present knowledge.

The reaction may be conducted in two steps. Step A—One molecular proportion of 1-methyl alpha naphthothiazole is condensed with one molecular proportion of ethyl-p-toluene sulfonate by heating the substances together at 100° C. for approximately six hours. Step B—The resulting crude product, which comprises substantially 1-methyl-alpha-naphthothiazole etho-p-toluene sulfonate is condensed with one molecular proportion of quinoline ethiodide using one molecular proportion of potassium hydroxide, the reaction being carried out in boiling absolute ethyl alcohol. This mixture is refluxed 15 minutes. Upon cooling, the dye separates and may be recrystallized from methyl alcohol. The resulting dye obtained consists of scarlet needles which impart to a methyl alcohol solution a crimson red coloration. The several reactions are believed to be as follows:

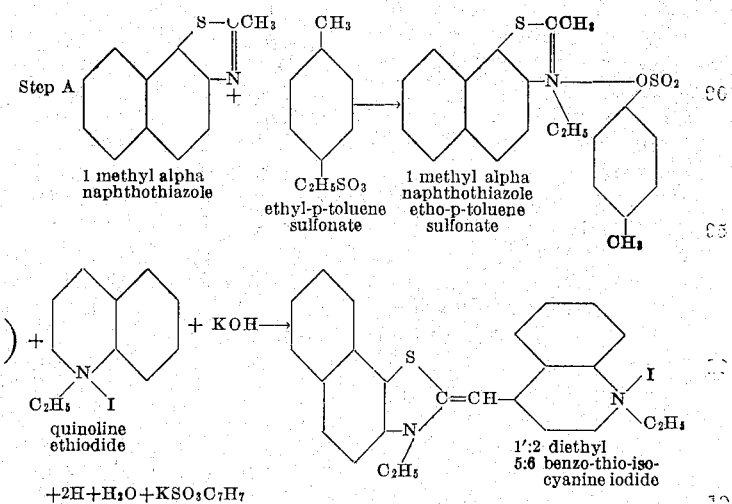

*Example 1.*—In the preparation of 1′:2-diethyl-5:6-benzothio-iso-cyanine iodide, one member of the series, I first prepare from beta-naphthylamine the intermediate 1-methyl alpha naphthothiazole by well known academic methods. This intermediate has the following structural formula:

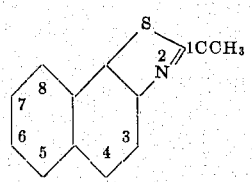

The isomeric 2 methyl beta naphthothiazole has the following structure:

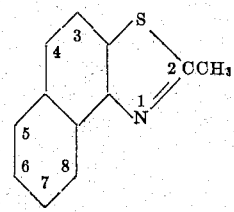

*Example 2.*—If an equivalent amount of 2-methyl-beta-naphthothiazole ethiodide be used in place of the 1-methyl-alpha-naphthothiazole etho-p-toluene sulfonate used in Example 1, a product will be obtained consisting of brown needles with a brassy green reflex. This dye will give a crimson solution in methyl alcohol. This may be called 1′:2-diethyl-3:4-benzothio-iso-cyanine iodide.

*Example 3.*—In the preparation of 1′:2-diethyl-3:4-benzothio-pseudo-cyanine iodide, another member of the series, I first prepare a 2-methyl-beta-naphthothiazole ethiodide by the following method:

Equimolecular proportions of 2-methyl-β-naphthothiazole and of ethyl-p-toluene sulfonate are heated together in an oil bath for a week at 130–140°. When this salt is to be used it is purified by extracting the unchanged starting materials with acetone, in which the 2-methyl-β-naphthothiazole etho-p-toluene sulfonate is sparingly soluble. This salt may be converted into the iodide by double decomposition in fairly concentrated aqueous solutions with potassium iodide, whereby 2-methyl-β-naphthothiazole ethiodide is obtained. This substance is washed and dried at an elevated temperature, and has the following composition:

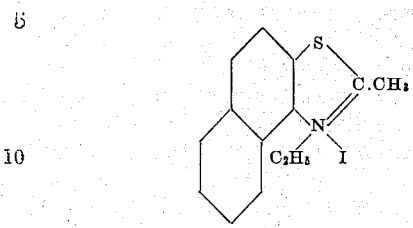

The dye may be made from this intermediate in one step: 9.5 parts of 2-methyl-β-naphthothiazole ethiodide and 11 parts of 2-iodo-quinoline ethiodide are suspended in 63 parts of absolute ethyl acohol. To this suspension are added with constant vigorous shaking 3.6 parts of potassium hydroxide (of about 85% purity) in absolute ethyl alcohol, the alkali being added to the boiling alcoholic suspension gradually during a period of from 5 to 10 minutes. Boiling is continued for a period of 15 minutes after all the alkali has been added. The dye is filtered from the cooled solution and is purified by washing with boiling water and then with cold water followed by acetone. If the above example be conducted by using parts by weight in the c. g. s. system a yield of approximately 8.9 grams of unrecrystallized dye will be produced. This is purified by crystallization from methyl alcohol and is obtained in light brown plates and gives to a methyl alcohol solution a pinkish orange coloration.

The several reactions involved in the above example are believed to be as follows:

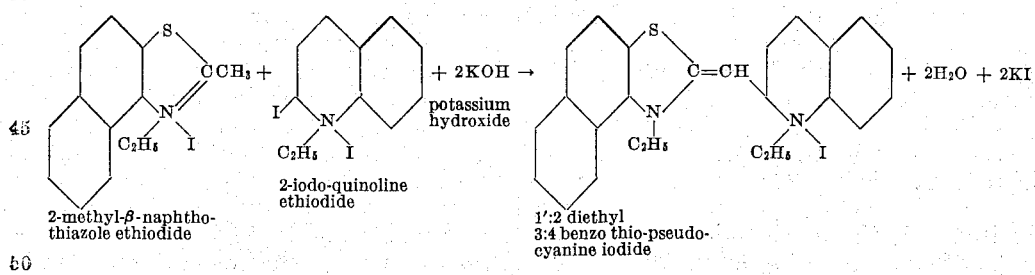

*Example 4.*—If in the above reaction (Example 3) a 1-methyl-alpha-naphthothiazole ethiodide is used in place of the 2-methyl-β-naphthothiazole ethiodide there is obtained a 1':2-diethyl-5:6-benzothio-pseudo-cyanine iodide. This dye crystallizes in light brown crystals which, on solution in methyl alcohol, give to that solution a pinkish orange coloration.

*Example 5.*—Ten parts of 2-methyl-β-naphthothiazole etho-p-toluene sulfonate which may be readily prepared from 2-methyl-β-naphthothiazole is boiled under reflux in 24 parts of dry pyridine with 8.1 parts of triethyl ortho acetate for 1½ hours. An excess of ammonium bromide in hot water is added and the whole allowed to cool. Crystals of 8-methyl-2:2'-diethyl-3:4:3':4' dibenzo thiocarbcyanine bromide are thereby obtained.

*Example 6.*—One part of 1-methyl-alpha-naphthothiazole is heated with one part of allyl iodide under reflux on a steam bath. The initial reaction is rapid and heating is continued for a further 2½ hours. The product is dissolved in 19 parts of pyridine and boiled under reflux with 1.5 parts of ethyl ortho formate. 2:2' diallyl 5:6:5':6 dibenzo thiocarbocyanine iodide is obtained after precipitation with potassium iodide.

The nomenclature and the numbering of these compounds and intermediates are the same as that used in my co-pending application, Serial Number 337,177, filed February 2, 1929. This numbering, of course, is entirely arbitrary but the system herein employed is according to current usage. A thio iso cyanine dye derived from 1-methyl-alpha-naphthothiazole, for instance, will have the following structure:

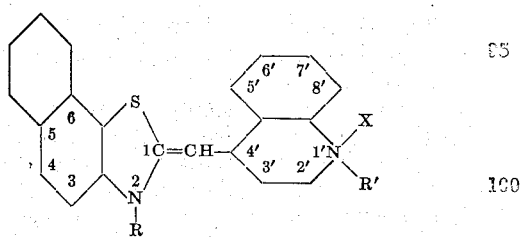

and will be called a 1':2-dialkyl-5:6-benzo thio-iso-cyanine salt. A dye similarly derived from the 2-methyl-β-naphthothiazole will have the following structure:

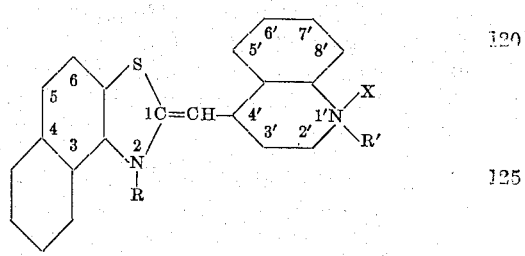

and in accordance with the numbering system used with the above dye, dyes of this class will be called 1′: 2-dialkyl-3 : 4-benzo-thio-iso-cyanine salts.

A thio pseudo cyanine dye derived from 1-methyl-alpha-naphthothiazole alkyl quaternary salt, for instance, will have the following structure:

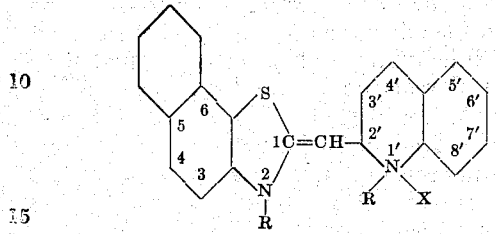

and will be called a 1′: 2-dialkyl 5 : 6-benzo thio-pseudo-cyanine salt.

A thio pseudo cyanine dye derived from 2-methyl-β-naphthothiazole alkyl quaternary salt will have the following structure:

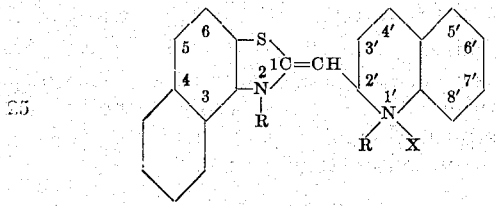

and in accordance with the numbering system used will be a 1′: 2-dialkyl 3 : 4-benzo thio-pseudo-cyanine salt.

It will be noted that of the two intermediates specifically disclosed, one is called the 2-methyl-beta, the other the 1-methyl-alpha naphthothiazole. This nomenclature, while it appears somewhat inconsistent, is that in current usage, and results from a numbering of the rings counter clockwise for the 2-methyl-beta and clockwise for the 1-methyl-alpha naphthothiazole when the structures of the bases are drawn as shown. Instead of calling them 1-methyl or 2-methyl, the intermediate carbon atom to which the methyl group is attached being the same in either case, this position is sometimes called the mu position. When mu appears herein, therefore, it will refer to this intermediate carbon atom.

By a substitution in the above major structural formulæ of similar or dissimilar alkyl radicals in the R positions many sensitizing dyes may be obtained. The X indicates any suitable acid radical such, for example, as the halides, p-toluene sulfonate, alkylo sulfate or, in fact, any suitable acid radical which will not greatly decrease or destroy the sensitizing properties of the dye, this radical being necessary to give electrical neutrality to the molecule. In the claims the phrase—"a suitable acid radical"—is employed to designate this group of acid radicals. Furthermore, the use of fused-on substituted benzene nuclei or substituted or unsubstituted naphthalene nuclei or similar groupings in the 3 : 4 or 5 : 6 position will come within the scope of this invention as will also dyes containing substituents in the quinoline nucleus.

In the preparation of an emulsion containing these photo-sensitizers, it has been found that they may be incorporated from their solution in methyl alcohol in from 5 to 100 milligrams to 100 cc. of the emulsion. While some of the sensitizers require less, others require more than the amounts given above, generally about 50 milligrams is sufficient to obtain the maximum sensitivity effect from a dye having good sensitizing power. The more powerful dyes, however, may require as little as 5 milligrams.

It is apparent from the above description that any of the thio-iso or thio pseudo cyanines in which substituted or unsubstituted benzene rings are fused on to the benzo thiazole nucleus of the parent thio-iso or thio pseudo cyanine molecule in the 3 : 4 or the 5 : 6 position and dyes of this type containing similar or dissimilar alkyl groups, and in which various suitable acid radicals are attached to one of the nitrogen atoms in the molecule, will come within the scope of this invention, together with the employment of such dyes for photographic sensitizing and other purposes. The quinoline nucleus of these dyes may likewise be substituted or unsubstituted.

What I claim as new and desire to be secured by Letters Patent of the United States is:

1. A photographic gelatino-silver-halide emulsion containing a cyanine dye which contains a naphthothiazole nucleus and a quinoline nucleus.

2. A photographic gelatino-silver-halide emulsion containing a cyanine dye which contains a naphthothiazole nucleus and a quinoline nucleus, the nitrogen atoms of the two nuclei being connected by a chain consisting of an uneven number of carbon atoms.

3. A photographic gelatino-silver-halide-emulsion containing a cyanide dye containing a quinoline nucleus and a naphthothiazole nucleus, the nitrogen atoms of which are each linked to an alkyl group while one is also linked to a suitable acid radical.

4. A photographic gelatino-silver-halide-emulsion containing a cyanine dye containing a quinoline nucleus and a naphthothiazole nucleus, the nitrogen atoms of which are linked to dissimilar alkyl groups while one is also linked to a suitable acid radical.

5. A photographic gelatino-silver-halide-emulsion containing a cyanine dye containing a quinoline nucleus and a naphthothiazole nucleus, the nitrogen atoms of which are each linked to an ethyl group while one is also linked to an iodine atom.

6. A photographic gelatino-silver-halide emulsion containing a cyanine dye of the thio-pseudo-cyanine series containing a naphthothiazole nucleus.

7. A photographic gelatino-silver-halide emulsion containing a cyanine dye which contains a naphthothiazole nucleus and a quinoline nucleus, the nitrogen atoms of the two nuclei being connected by a chain consisting of three carbon atoms.

8. A photographic gelatino-silver-halide empulsion containing a 3:4-benzo-thio-pseudo-cyanine salt.

9. A photographic gelatino-silver-halide-emulsion containing a 1':2 dialkyl-benzo-thio-pseudo-cyanine salt.

10. A photographic gelatino-silver-halide emulsion containing a 1'-alkyl-2-alkyl-benzo-thio-pseudo-cyanine salt.

11. A photographic gelatino-silver-halide emulsion containing a 1':2-diethyl-3:4-benzo-thio-pseudo-cyanine salt.

12. A photographic gelatino-silver-halide emulsion containing a 1'-ethyl-2-methyl-3:4-benzo-thio-pseudo-cyanine salt.

13. A photographic gelatino-silver-halide emulsion containing a 1':2 dimethyl-3:4-benzo-thio-pseudo-cyanine salt.

14. A photographic gelatino-silver-halide emulsion containing a cyanine dye of the thio-iso-cyanine series containing a naphthothiazole nucleus.

15. A photographic gelatino-silver-halide emulsion containing a cyanine dye which contains a naphthothiazole nucleus and a quinoline nucleus, the nitrogen atoms of the two nuclei being connected by a chain consisting of five carbon atoms.

16. A photographic gelatino-silver-halide emulsion containing a 3:4-benzo-thio-iso-cyanine salt.

17. A photographic gelation-silver-halide emulsion containing a 1':2-dialkyl-thio-iso-cyanine salt.

18. A photographic gelatino-silver-halide emulsion containing a 1'-alkyl-2-alkyl-benzo-thio-iso-cyanine salt.

19. A photographic gelatino-silver-halide emulsion containing a 1':2-diethyl-3:4-benzo-thio-iso-cyanine salt.

20. A photographic gelatino-silver-halide emulsion containing a 1'-ethyl-2-methyl-3:4-benzo-thio-iso-cyanine salt.

21. A photographic gelatino-silver-halide emulsion containing a 1'-methyl-2-ethyl-3:4-benzo thio-iso-cyanine salt.

22. As a new product, a photographic film coated with a gelatino-silver-halide emulsion containing a cyanine dye which contains a naphthothiazole nucleus and a quinoline nucleus.

Signed at Rochester, New York, this 5th day of March, 1930.

LESLIE G. S. BROOKER.

Certificate of Correction

Patent No. 1,861,836.  June 7, 1932.

LESLIE G. S. BROOKER.

It is hereby certified that error appears in the printed specification of the above-numbered patent requiring correction as follows: Page 2, lines 48 to 54, strike out the formula and insert instead—

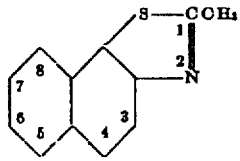

page 3, line 79, for "5:6:5':6" read *5:6:5':6'*; page 4, line 110, claim 3, for "cyanide" read *cyanine*; page 5, line 8, claim 8, for "empulsion" read *emulsion*; line 38, claim 17, for "gelation" read *gelatino* and line 39, for "1':2-dialkyl-thio-iso-" read *1':2-dialkyl-benzo-thio-iso-*; and that the said Letters Patent should be read with these corrections therein that the same may conform to the record of the case in the Patent Office.

Signed and sealed this 16th day of August, A. D. 1932.

[SEAL.]

M. J. MOORE,
*Acting Commissioner of Patents.*